I. DODENHOFF.
Harvester Rake.
No. 18,009.
Patented Aug. 18, 1857.
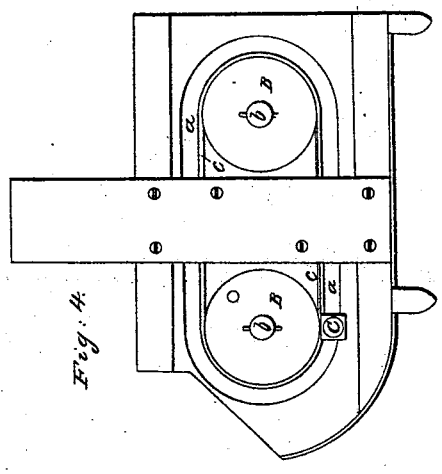
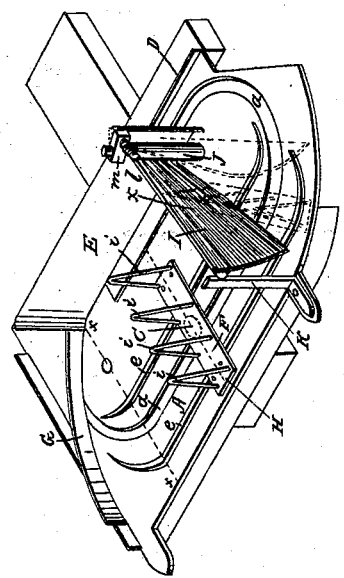
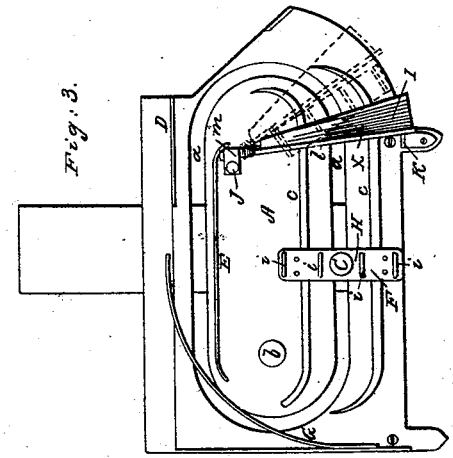
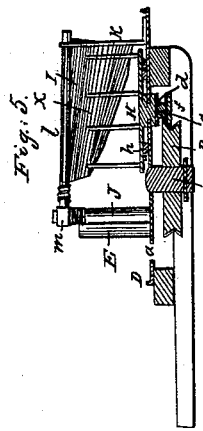
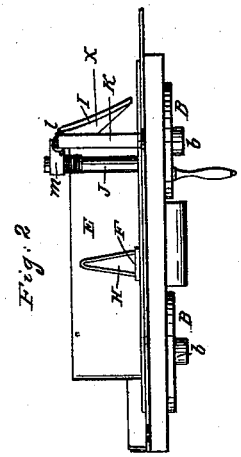

UNITED STATES PATENT OFFICE.

ISRAEL DODENHOFF, OF BLOOMINGTON, ILLINOIS.

IMPROVED RAKING APPARATUS FOR HARVESTERS.

Specification forming part of Letters Patent No. 18,009, dated August 18, 1857.

*To all whom it may concern:*

Be it known that I, ISRAEL DODENHOFF, of Bloomington, in the county of McLean and State of Illinois, have invented a new and useful Improvement in Automatic Rakers, of which the following is a full, clear, and exact description, reference being had to the accompanying drawings, making part of this specification, in which—

Figure 1 represents a perspective view of my raking-machine; Fig. 2, a front elevation; Fig. 3, a plan; Fig. 4, an inverted plan, and Fig. 5 a vertical section taken through the line *x x* of Fig. 1.

My invention relates to certain improvements in the raking apparatus of harvesting-machines, as will be hereinafter fully described.

To enable others skilled in the art to make, construct, and use my invention, I will now proceed to describe its parts in detail.

The platform A, for the reception of the grain as it is cut, is similar to those in general use, with the exception of an endless channel or slot, *a*, having two sides parallel with the cutter-bar and semicircular at their ends. On the under side of the platform, surrounded by the endless channel *a*, and at either end, are arranged studs *b'*, upon which two pulleys, B and B', are mounted, to one of which motion is communicated in any suitable manner from the driving-wheel of the reaper. Round these two pulleys B and B' is passed an endless chain or belt, *c*, provided with a belt hook or arm, *d*, having a bearing for the reception of a wrist, C, on which the rake is mounted. This wrist has a collar or flange, *f*, on its lower end to prevent it from sliding off the belt-hook *d*, there being two guiding-flanges, *g* and *g'*, secured upon it, the one arranged above and the other below the platform, which assist in guiding the wrist C in the endless channel and confining the rake to the platform when in motion. By this arrangement the rake is guided firmly on its way and all lateral deflection prevented, while a free play around its center is allowed, so that the relative position of the rake on different parts of the platform can be changed as required.

In the rear of the platform and on both sides of the endless channel *a* are secured guide bars or frames D E for the purpose of guiding the rake endwise as it passes along that part of the platform on its return to recommence raking, for the purpose of keeping it out of the way of the falling grain.

On the front part of the platform and on both sides of the endless channel *a* are also secured two rails, *e*, parallel to each other and the finger-bar, and curved at either end for the purpose of guiding the rake in proper position while in the act of raking, there being for this purpose two guide-pieces, *h*, formed or otherwise secured to the under side of the rake-head F, by means of which, when brought in contact with the guide-rails *e*, the rake is turned broadside to the grain for the purpose of sweeping it off the platform. Lest the rake may turn too far round, and thus prevent the guides on the under side of the rake-head from engaging with the rails, a guide-spring, G, is secured at the semicircular part, next the standing grain, of the endless channel *a*, which guides the rake on the curved rails *e* as it passes to the front part of the platform.

The rake H is constructed of a series of metallic rods, *i*, each shaped in an angular form at the top and riveted or otherwise secured on both ends to the base plate or head F, which is in turn mounted and secured on the wrist C.

The gate I, which is used for compressing the grain against the raker as the latter advances, is formed of a plate or board, *k*, attached to a horizontal rocking beam, *l*, pivoted on the standard J by means of the frame *m*, mounted on the upper end of the standard J, to which the rocking beam is fastened in any suitable manner. As the rake advances it causes the grain to force back the gate I, which of itself, unless made very heavy and set at an inclination, would be insufficient to compress the grain, to obviate which, and also to bring the gate back to its original position against the standard K or reel-bearer, a spring is so coiled round and secured to the standard J and gate-frame *m* as to cause it to bear against the grain with sufficient force to render it compact and to force it back when relieved from the pressure of the rake. The gate for this purpose turns upon its shaft *l*, suffering the rake to pass underneath it and deposit the grain upon the ground, whence it is again deflected by the action of another spring arranged around its shaft, and to which one end is attached, while the other is secured to the frame *m*, in which the shaft is mounted and turns.

When the machine is put in operation the rake, while passing on the front part of the platform, is kept in proper position by the curved rails e to rake off the grain; but on its arrival at or between the standards J and K it forces back the gate to the discharging-place, the plate or board of the gate compressing the grain meanwhile, from which point, as it passes round the semicircular part of the endless channel, the rake slips out under the gate, leaving and discharging at the same time the grain in a compact bundle on the ground. The rake is then directed endwise along the rear of the platform by the guiding bars or frames D E until it reaches the guide-spring G, which directs it on the curved rails as it repasses to the front part of the machine to renew the operation of raking.

Having thus fully described my invention, what I claim as new, and desire to secure by Letters Patent, is—

1. The rake H, in combination with the platform A and stationary and elastic guides, the whole being constructed and operated substantially as described.

2. The gate I, in combination with a rake, H, traveling in a horizontal endless track, the whole being constructed and operated in the manner substantially as and for the purposes set forth.

In testimony whereof I hereunto set my hand in presence of two subscribing witnesses.

ISRAEL DODENHOFF.

Witnesses:
JESSE BIRCH,
THOS. BIRCH.